US006991891B1

(12) United States Patent
Laming et al.

(10) Patent No.: US 6,991,891 B1
(45) Date of Patent: Jan. 31, 2006

(54) OPTICAL FIBER LASER

(75) Inventors: Richard Ian Laming, Edinburgh (GB); Michael Nickolaos Zervas, Hampshire (GB); Sze Yun Set, Tokyo (JP); Morten Ibsen, Hampshire (GB); Erland Ronnekleiv, Trondheim (NO); Shinji Yamashita, Tokyo (JP)

(73) Assignee: University of Southampton, Hampshire (GB)

( * ) Notice: Subject to any disclaimer, the term of this patent is extended or adjusted under 35 U.S.C. 154(b) by 0 days.

(21) Appl. No.: 09/688,668

(22) Filed: Oct. 16, 2000

Related U.S. Application Data

(63) Continuation of application No. PCT/GB99/01105, filed on Apr. 9, 1999.

(30) Foreign Application Priority Data

Apr. 17, 1998 (GB) .................................... 9808265

(51) Int. Cl.
*G02F 1/35* (2006.01)
*G02B 6/16* (2006.01)

(52) U.S. Cl. .............................. 430/321; 430/1; 430/2; 385/11; 385/37; 385/123

(58) Field of Classification Search ................ 430/321, 430/1, 2; 385/11, 37, 123
See application file for complete search history.

(56) References Cited

U.S. PATENT DOCUMENTS

| | | | | |
|---|---|---|---|---|
| 5,363,239 A * | 11/1994 | Mizrahi et al. | ............. | 359/570 |
| 5,386,314 A | 1/1995 | Jopson | ....................... | 385/122 |
| 5,550,654 A | 8/1996 | Erdogan et al. | .............. | 385/11 |
| 5,881,197 A * | 3/1999 | Dong et al. | ................. | 385/127 |
| 5,956,442 A * | 9/1999 | Byron | ......................... | 385/37 |

FOREIGN PATENT DOCUMENTS

| | | | |
|---|---|---|---|
| AU | 9477668 | * | 5/1995 |
| EP | 0 652 653 A1 | | 5/1995 |
| GB | 2 299 203 A | | 9/1996 |
| GB | 2 316 760 A | | 3/1998 |

OTHER PUBLICATIONS

Hubner et al., <<Phenomenaological Model of UV-indued Braggg Grating Growth in Germaonsilicate Fibers>>, SPIE 2998, pp. 11-21 (Feb. 1997) teaches the use of various UV sources for writing fiber gratings.*

Erdogan, et al., "Charcachtorization of UV-Induced Birefringence in Photosensitive Ge-Doped Silica Optical Fibers", , JOSA B vol. 11(10), pp. 2100-2105 (Oct. 1994).*

S Y Set et al., "Optimization of DSF- and SOA-Based Phase Conjugators by Incorporating Noise-Suppressing Fiber Gratings" IEEE Journal of Quantum Electronics, vol. 33, No. 10, Oct. 1, 1997, pp. 1694-1698.

Yamashita et al., "Polarization Independent, All-Fiber Phase Conjugation Incorporating Inline Fiber DFB Lasers" IEEE Photonics Technology Letters, vol. 10, No. 10, Oct. 1998, pp. 1407-1409.

(Continued)

*Primary Examiner*—Martin Angebranndt
(74) *Attorney, Agent, or Firm*—Renner, Otto, Boisselle & Sklar, LLP

(57) ABSTRACT

A method of fabricating a distributed feedback optical fiber laser, comprises the step of exposing an optical fiber (20) to a transverse light beam (30) to form a grating structure in a section of the optical fiber, the writing light beam being polarized in a direction not parallel to the axis of the section (10) of optical fiber (20).

25 Claims, 9 Drawing Sheets

OTHER PUBLICATIONS

Kringlebotn, J.T. et al., "$Er^3$+:$Yb^3$+-codoped fiber distributed-feedback laser", Jul. 18, 1994, pp. 2101-2103.
Asseh, A. et al., "10 cm $Yb^3$+ DFB fibre laser with permanent phase shifted grating", Electronic Letters, vol. 31, No. 12, Jun. 8, 1995, pp. 969-970.
Loh, W. H., "1.55μm phase-shifted distributed feedback fibre laser", Electronic Letters, vol. 31, No. 17, Aug. 17, 1995, pp. 1440-1442.
Hübner, J., "Five wavelength DFB fibre laser source for WDM systems", Electronic Letters, vol. 33, No. 2, Jan. 16, 1997, pp. 139-140.
Harutjunian, Z.E. et al., "Single polarisation twisted distributed feedback fibre laser", Electronic Letters, vol. 32, No. 4, Feb. 15, 1996, pp. 346-348.
Douay, M. et al., "Birefringence Effect of Optical Fiber Laser with Intracore Fiber Bragg Grating", IEEE Photonics Technology Letters, vol. 5, No. 8, Aug. 1992, pp. 844-846.
Niay, P. et al., "Polarization Selectivity of Gratings Written in Hi-Bi Fibers by the External Method", IEEE Photonics Technology Letters, vol. 7, No. 4, Apr. 1995, pp. 391-393.
Dong, L. et al., "Efficient single-frequency fiber lasers with novel photosensitive Er/Yb optical fibers", Optics Letters, vol. 22, No. 10, May 15, 1997, pp. 694-696.
Lauridsen, V.C. et al., "Design of Distributed Feedback Fibre Lasers", Sep. 22-25, 1997, pp. 39-42.
Ellis, A.D. et al., "40Gbit/s transmission over 202km of standard fibre using midspan spectral inversion", Electronic Letters, vol. 31, No. 4, pp. 299-301.
Royset, A., "Linear and Nonlinear Dispersion Compensation of Short Pulses Using Midspan Spectral Inversion", IEEE Photonics Technology Letters, vol. 8, No. 1, Mar. 1996, pp. 449-451.
Hasegawa, Takasi et al., "Polarization Independent Frequency Conversion by Fiber Four-Wave Mixing with a Polarization Diversity Technique", IEEE Photonics Technology Letters, vol. 5, No. 8, Aug. 1993, pp. 947-949.
Lacey, J. P. R. et al., "Four-Channel Polarization-Insensitive Optically Transparent Wavelength Converter", IEEE Photonics Technology Letters, vol. 9, No. 10, Oct. 1997, pp. 1355-1357.
Jopson, R. M. et al., "Polarisation-independent phase conjugation of lightwave signals", Electronic Letters, vol. 29, No. 25, Dec. 9, 1993, pp. 2216-2217.
Inoue, Kyo, "Polarization Independent Wavelength Conversion Using Fiber Four-Wave Mixing with Two Orthogonal Pump Lights of Different Frequencies", Journal of Lightwave Technology, vol. 12, No. 11, Nov. 1994, pp. 1916-1920.
Kuwatsuka, H. et al., "THz frequency conversion using nondegenerate four-wave mixing process in a lasing long-cavity λ/4-shifted DFB laser", Electronic Letters, vol. 31, No. 24, Nov. 23, 1995, pp. 2108-2110.
Watanabe, S. et al., "Polarisation-insensitive wavelength conversion and phase conjugation using bi-directional forward four-wave mixing in a lasing DFB-LD", Electronic Letters, vol. 33, No. 4, Feb. 13, 1997, pp. 316-317.
Loh, W. H. et al., "High Performance Single Frequency Fiber Grating-Based Erbium:Ytterbium-Codoped Fiber Lasers", Journal of Lightwave Technology, vol. 16, No. 4, Jan. 1998, pp. 114-118.
Loh, W. H. et al., "40GHz optical-millimetre wave generation with a dual polarisation distributed feedback fibre laser", Electronic Letters, vol. 33, No. 7, Mar. 27, 1997, pp. 594-595.
Storoy et al., "Single Polarisation Fibre DFB Laser", Electronics Letters, vol. 33, No. 1, pp. 56-58, Jan. 2, 1997.
Ronnekleiv, Erland. Poster presentation entitled "Modelling Polarization Mode Competition in Fiber DFB-Lasers." Presented at Norwegian Electro-Optics Meeting, 1997, Geiranger, Norway, May 8-11, 1997.
Set et al. "High Bitrade...", ECOC '98 Proceedings, vol. 1 pp 183-184.

* cited by examiner

OPTICAL FIBER LASER

This application is a continuation of PCT Application No. PCT/GB99/01105 filed Apr. 9, 1999, which is hereby incorporated herein by reference in its entirety.

This invention relates to optical fibre lasers.

Optical fibre grating lasers are attractive alternatives to the already well established semiconductor technology because they are cheaper to manufacture, exhibit narrow line width for ultra high resolution sensing and excellent wavelength stability provided by the grating. Furthermore they are fibre compatible, making all-fibre systems for telecommunication possible.

Of the fibre lasers demonstrated to date the simplest is the all-fibre grating DFB (distributed feedback) or DBR (distributed Bragg reflector) laser. Demonstrations of DFB fibre lasers of different cavity configurations and pump schemes have been reported on several occasions [1–3]. The first of these demonstrations showed lasing in two orthogonal polarisation modes. Later publications of DFB lasers claimed to provide a single polarisation output, but none has appeared to demonstrate a good qualitative understanding of the requirements for truly single mode output (single frequency and single polarisation).

Of the previously reported writing techniques one publication claims to introduce what is believed to be a birefringent ir-phase-shift in the centre of the structure [4] caused by post-processing with high intensity pulses provided by excimer laser UV-sources (193 nm and 248 nm). The birefringent phase shift will then apply more to one polarisation than the other, hence causing that polarisation mode to reach the threshold for lasing before the other mode.

Twisting of the DFB fibre lasers and thereby an introduction of a circular birefringence has also been shown to cause the fibre laser to operate in a single polarisation [5]. This state of operation is then a function of the fibre twist and therefore the amount of circular birefringence introduced in the cavity. Furthermore Hi-Bi fibres have been shown to cause a significant [6] discrimination between the two polarisation modes with the result of allowing only one of the modes to lase.

However, there is still a need for a technique for generating robustly single polarisation DFB lasers.

This invention provides a method of fabricating a substantially single-polarisation optical fibre laser, the method comprising the step of exposing an optical fibre to a transverse writing light beam to form a grating structure in a section of the optical fibre, the writing light beam being polarised in a direction not parallel to the axis of the section of optical fibre so that the induced grating structure has a different grating strength for two orthogonal polarisation modes of the fibre, the grating structure comprising a discrete phase shift which is substantially identical for the two orthogonal modes.

In embodiments of the invention, by writing substantially an entire fibre laser with UV-light polarised perpendicular (or at least non-parallel) to the fibre axis, a difference in grating strength between the two orthogonal modes of the fibre is introduced. This provides strong polarisation mode discrimination and so a robust single polarisation fibre laser operation can be achieved. We show lasers of length 5 cm and of approximate grating strengths (κL) of ~8. The lasers have a discrete π-phase shift in the structure off-centre by 5 mm giving a ratio of grating strength ratio of 2:3 on either side of the phase shift.

Optical phase conjugation has been attracting considerable attention, because of its application in the compensation of chromatic dispersion and nonlinearities in optical fibre communication systems using midspan spectral inversion (MSSI) technique [10], [11], and also because of its application in wavelength conversion which is essential in wavelength-division multiplexed (WDM) optical networks.

It has been conventionally accomplished by four-wave mixing (FWM) in a dispersion-shifted fibre (DSF) or a semiconductor optical amplifier (SOA), in which the optical signal is mixed with an externally injected pump light through a fibre coupler, and fed into a DSF or an SOA to generate a wavelength converted conjugate light. The signal and pump polarisation states must be aligned to get maximum conversion efficiency, which is generally not practical since any signal light polarisation fluctuation will affect the power of the conjugated light.

Two solutions have been proposed to achieve polarisation independence in the device. These are: (i) a polarisation-diversity arrangement [12], [13]; and (ii) injection of two orthogonally polarised pump lights [14], [15]. However, they add more complexity in the phase conjugator/wavelength converter.

FWM in a distributed-feedback (DFB) semiconductor laser [16] is attractive because it does not require external injection of the pump light, but its polarisation independent implementation requires a phase-diversity arrangement [17].

The invention also provides an optical phase conjugator comprising:

- one or more in-line optical fibre lasers for generating two substantially orthogonally polarised pump light beams; and
- a non-linear mixing waveguide for receiving and mixing the pump beams with an input signal beam.

In this aspect of the invention, a novel phase conjugation and/or wavelength conversion technique by FWM is provided using orthogonally polarised pump lights—from inline fibre lasers. Embodiments of this technique feature polarisation independent operation and simple configuration without the need for external injection of pump light.

Further aspects and features of the invention are defined in the appended claims.

Embodiments of the invention will now be described, by way of example only, with reference to the accompanying drawings in which.

Figure 3A:
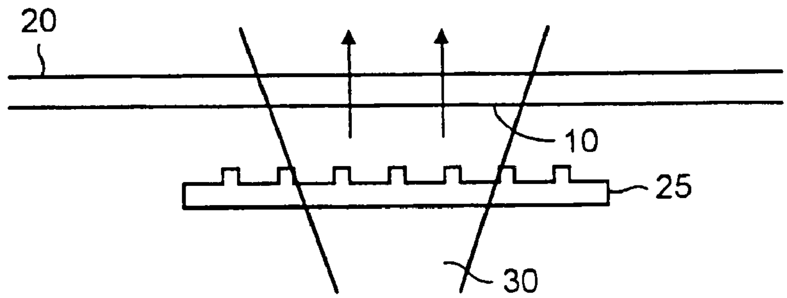
Figure 3B:
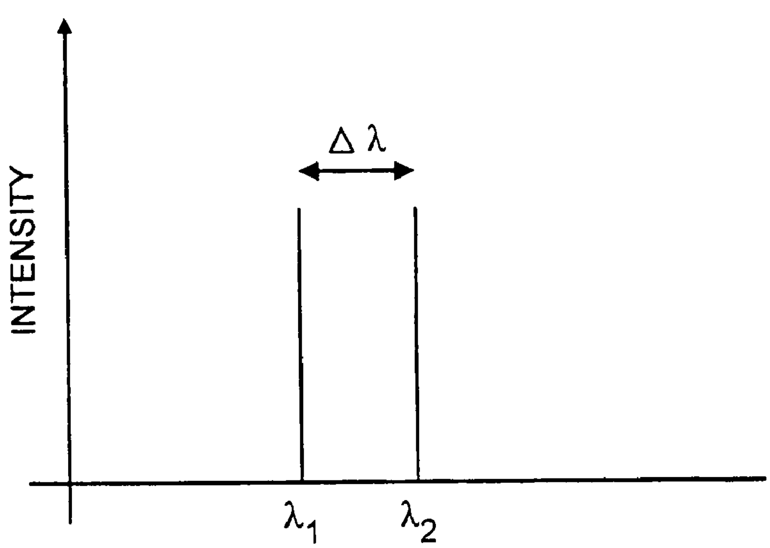
Figure 4A:
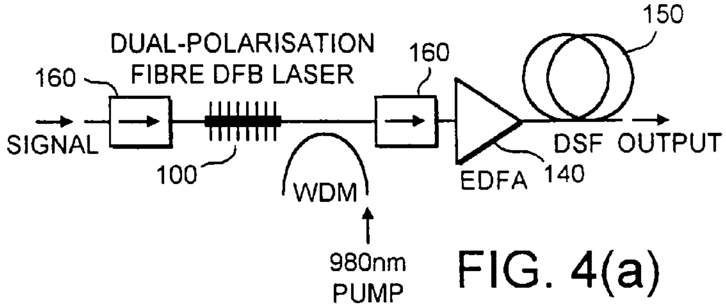
Figure 4B:
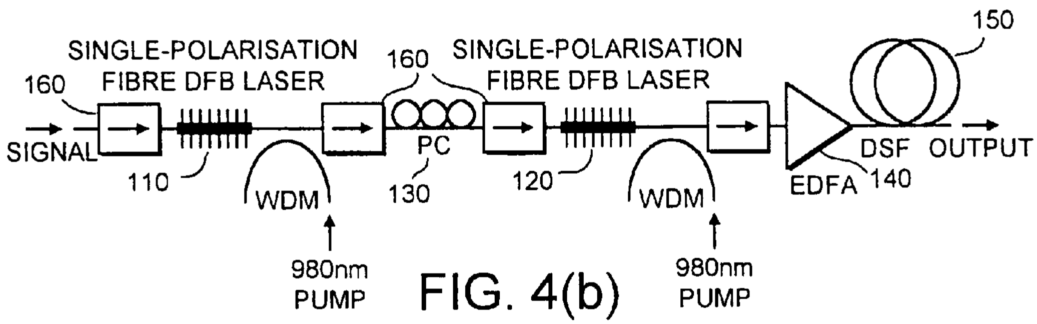
Figure 6C:
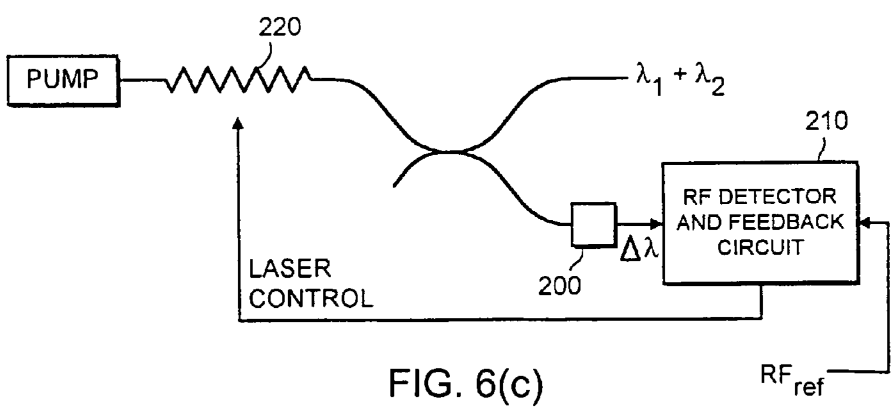
Figure 5A:
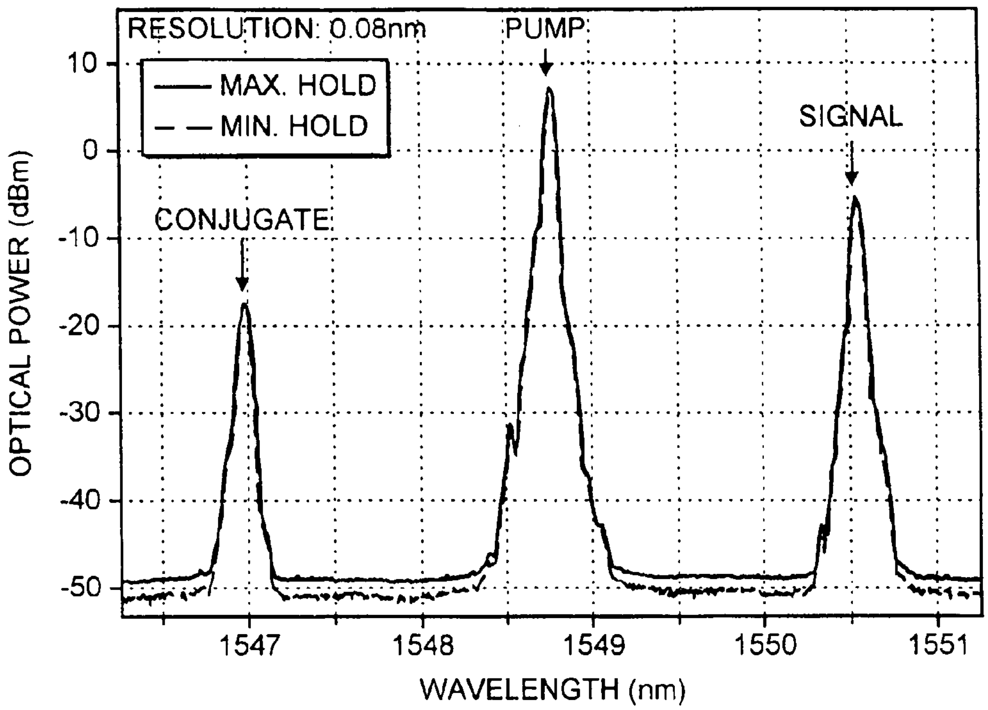
Figure 5B:
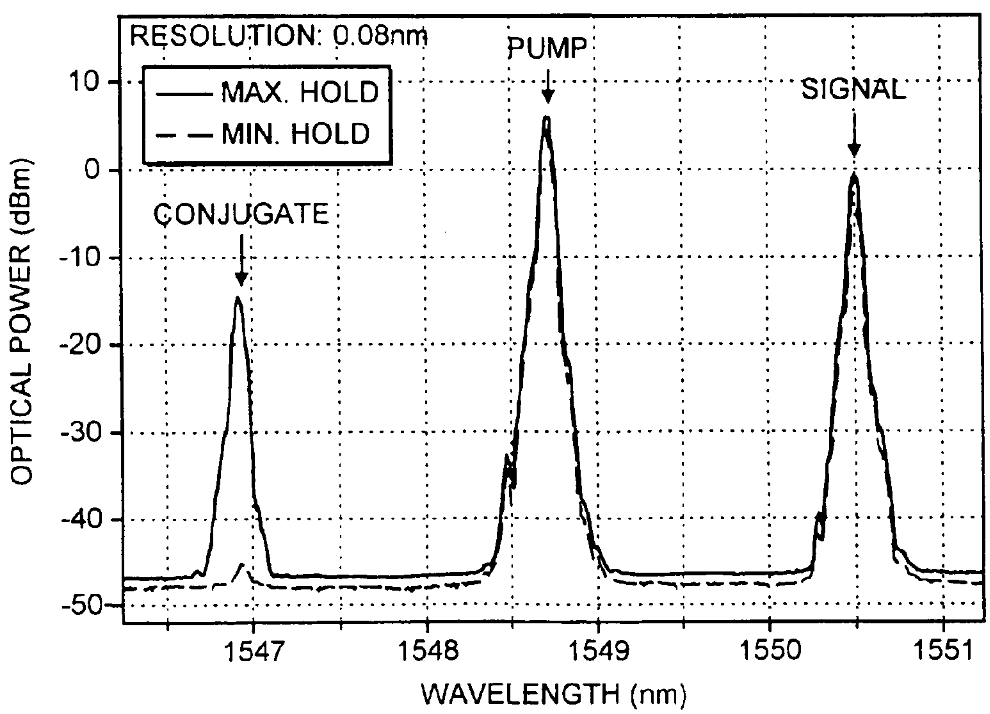
Figure 6A:
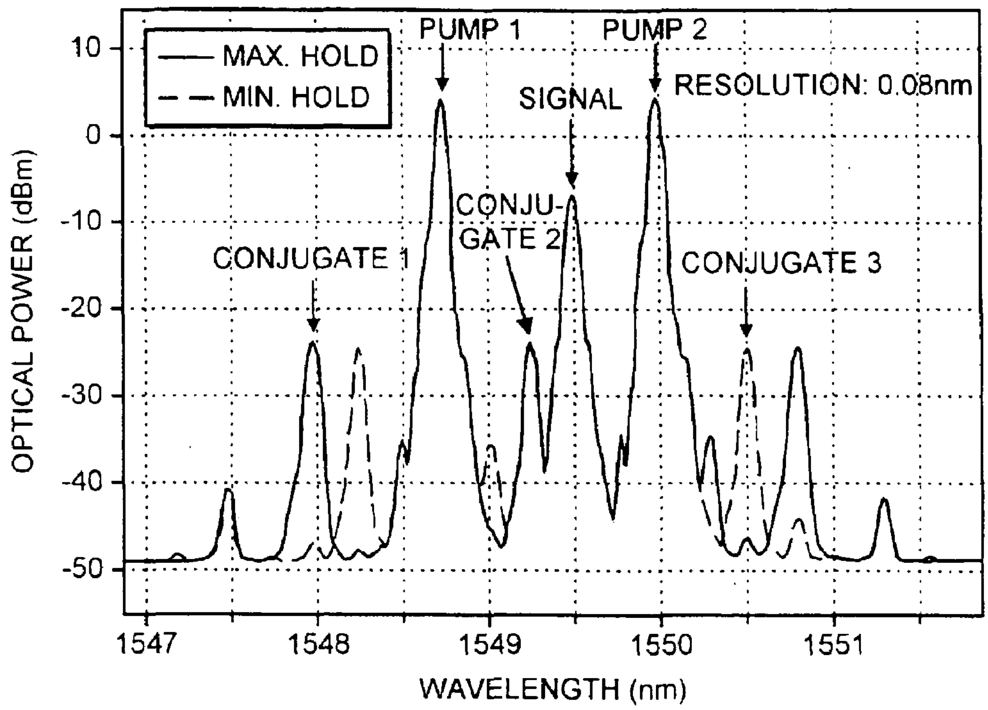
Figure 6B:
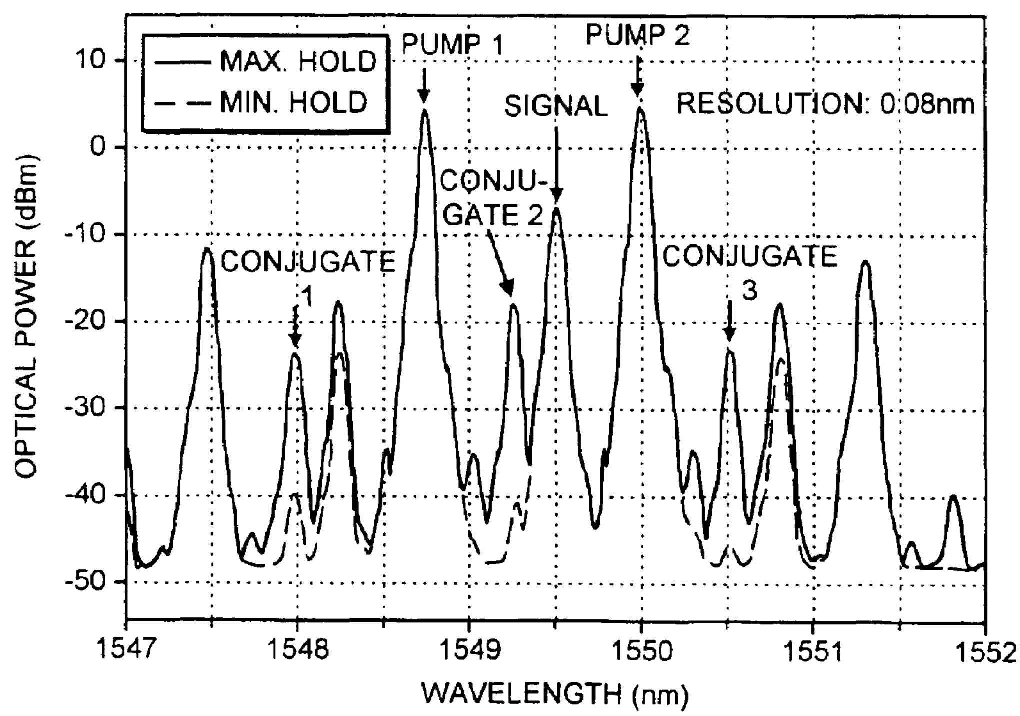
Figure 7:
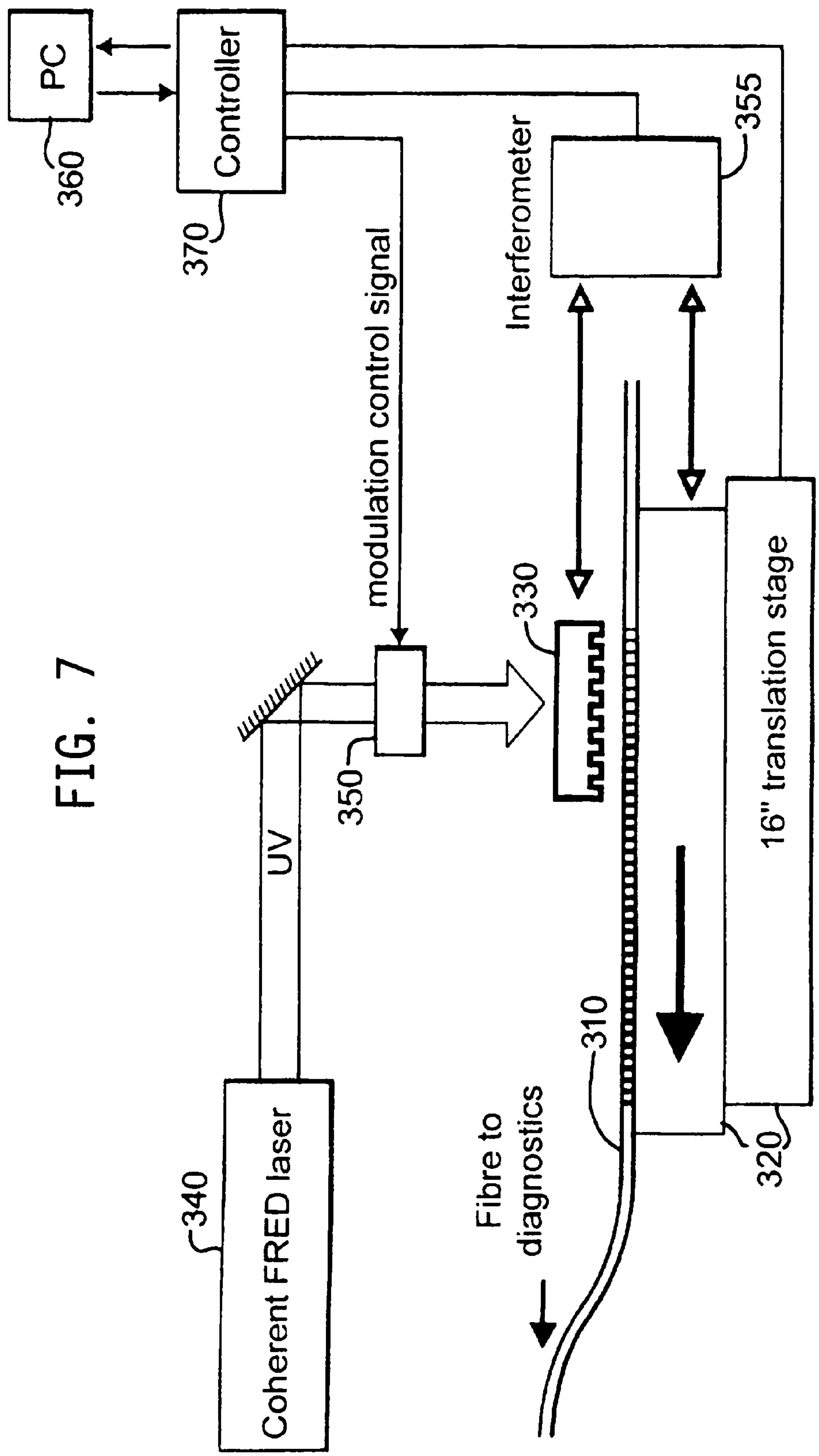
Figure 8A:
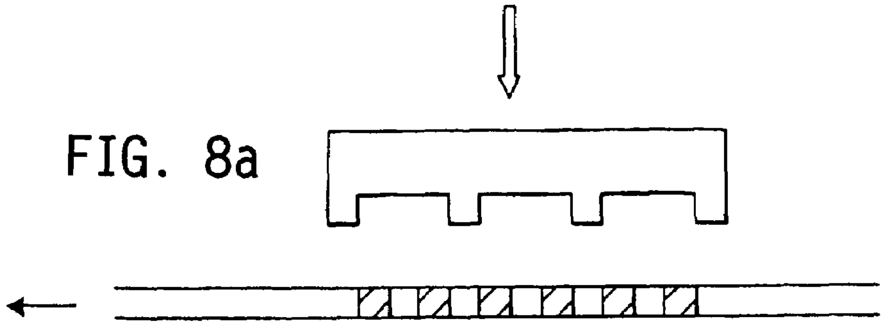
Figure 8B:
Figure 8C:
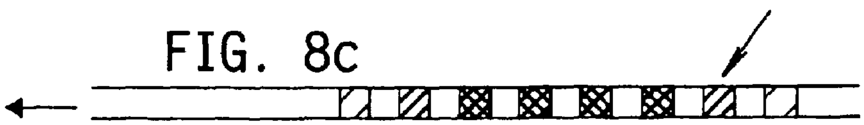
Figure 9A:
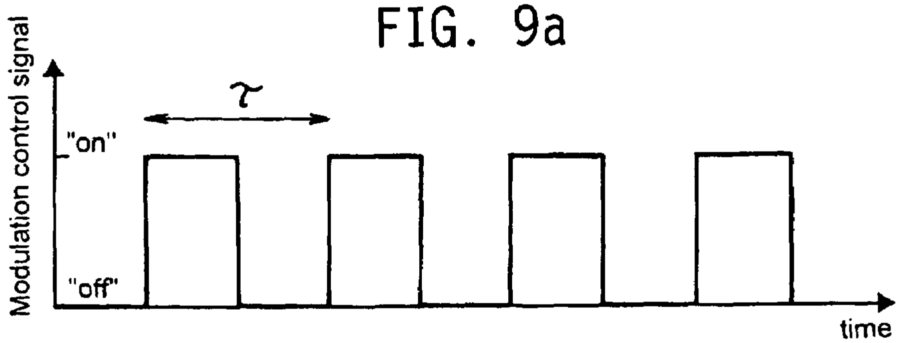
Figure 9B:
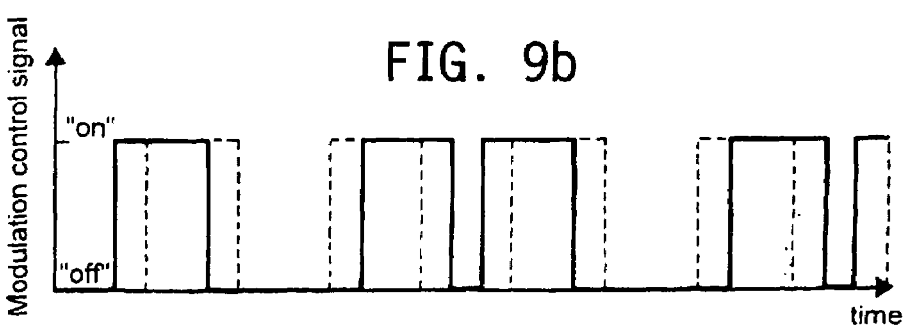
Figure 10A:
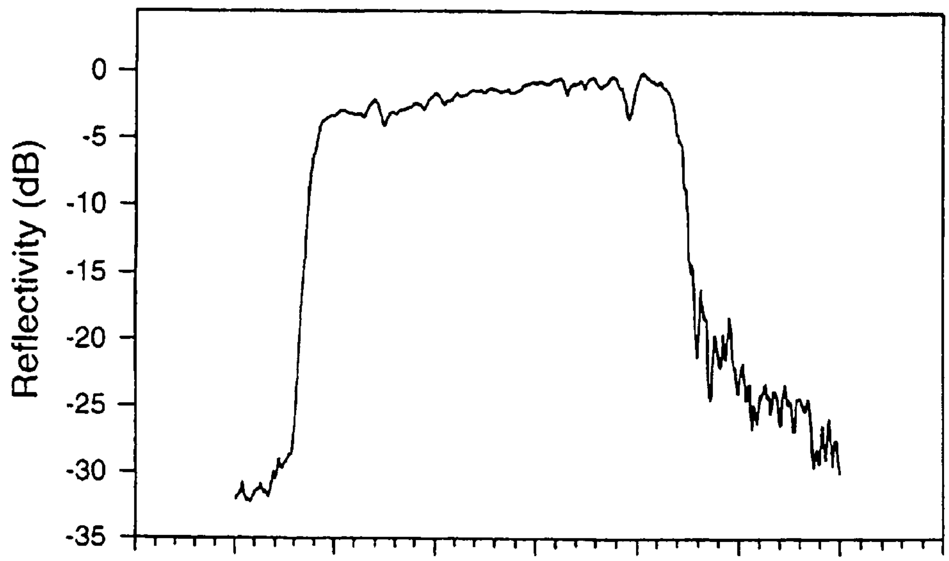
Figure 10B:
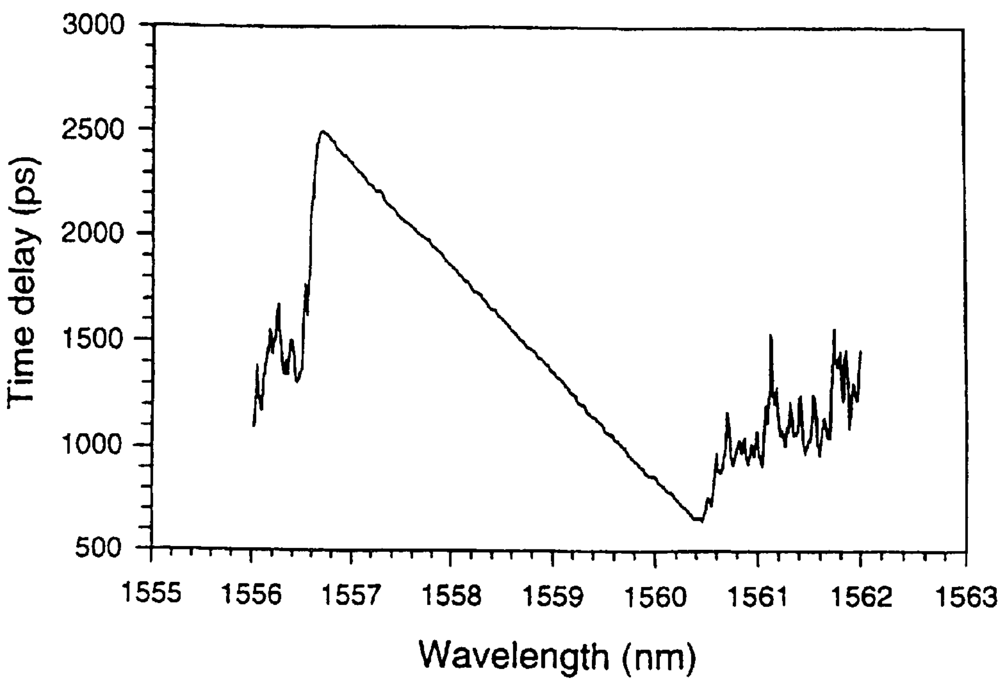

FIG. 3*a* schematically illustrates the fabrication process;

FIG. 3*b* illustrates the use of such a laser as a frequency standard source;

FIG. 4*a* is a schematic diagram illustrating a phase conjugator/wavelength converter using a dual-polarisation fibre DFB laser;

FIG. 4*b* is a schematic diagram illustrating a phase conjugator/wavelength converter using two single-polarisation fibre DFB lasers;

FIGS. 5*a* and 5*b* illustrate the output optical spectra of the phase conjugator/wavelength converter of FIG. 4*a* (using a dual-polarisation fibre DFB laser), where:

- the fibre DFB laser operates at dual polarisations (FIG. 5*a*); and
- the fibre DFB laser operates at a single polarisation (FIG. 5*b*);

FIGS. 6*a* and 6*b* illustrate the output optical spectra of the phase conjugator/wavelength converter of FIG. 4*b* (using two single-polarisation fibre DFB lasers, where:

the polarsation states of the two pump lights are othogonal (FIG. 6*a*); and the polarsation states of the two pump lights are aligned (FIG. 6*b*);

FIG. 6(*c*) illustrates an apparatus for monitoring Δλ and providing feedback to the laser control FIG. 7 is a schematic diagram of a prior art fibre grating fabrication apparatus;

FIGS. 8*a* to 8*c* are schematic diagrams showing a prior art grating fabrication process by repeated exposures;

FIGS. 9*a* and 9*b* are schematic timing diagrams showing the modulation of a UV beam; and FIGS. 10*a* and 10*b* are schematic graphs characterising a 20 cm grating produced by the apparatus of FIG. 7.

THEORETICAL BACKGROUND

Threshold and lasing conditions of DFB fibre lasers are functions of the grating strength (κL) where κ is the coupling coefficient and L is the length of the grating, and the gain available in the feedback structure.

For the core of an optical fibre to be photosensitive to UV light a certain amount of defects, or so-called Germano-Silica wrong bonds, must be present. The molecular characteristics of the wrong-bonds makes them susceptible for UV-light at a certain wavelength (e.g. 244 nm) to break the bond between them. The presence of wrong-bonds in the core of an optical fibre causes a stress that ideally should be isotropic. The presence of initial birefringence as is the case in most fibres however suggests a slightly anisotropic nature of the defects possibly generated by the drawing process of the fibres. The wrong-bond breakage introduced be the UV exposure causes a stress relief causing the refractive index to rise in the regions of the relief. A selective Ge—Si wrong-bond breakage therefore mainly will cause wrong-bonds polarised parallel to the polarisation of the light to be broken, and as result an anisotropic grating will be created in the core-region of the fibre.

Experimental Set-Up

The experimental set-up used to fabricate a prototype embodiment will now be described.

The DFB fibre lasers are written in a Deuterium loaded $Er^{3+}$:$Yb^{3+}$-doped fibre, to achieve increased pump absorption, with characteristics described elsewhere [8]. An intra-cavity frequency doubled Ar-ion laser operating CW at 244 nm with 100 mW output is used as the UV source. The grating forming the DFB laser was written using techniques and apparatus described in GB9617688.8, but other known techniques could instead be used.

According to GB9617688.8, an optical waveguide (e.g. an optical fibre) grating having a plurality of grating lines of refractive index variation is fabricated by a method comprising the steps of:

(i) repeatedly exposing a spatially periodic writing light pattern onto a photosensitive optical waveguide; and (ii) (moving the writing light pattern and/or the waveguide between successive exposures of the writing light pattern, so that each of at least a majority of the grating lines is generated by at least two exposures to different respective regions of the writing light pattern. Specific embodiments provide a number of advantages over previous techniques:

1. The realisation that the laser does not have to be pulsed but just has to be on for a particular duty cycle—preferably less than 50% of the period. This allows an externally modulated CW (continuous wave) laser to be used.
2. With this technique the grating lines are re-written by several successive exposures of the writing light beam at every grating period (or integral number of grating periods). Thus the footprint defined by the writing light beam is significantly overlapped with the previous lines. Significant averaging of the writing process is achieved thus improving the effective accuracy and resolution of the system, compared to that of R. Stubbe et al. postdeadline paper 1, Proc. Photosensitivity and Quadratic Nonlinearity in Glass Waveguides, Portland, Oreg. Sep. 9–11, 1995, where a group of lines is written in a single exposure, and the fibre is then advanced to a fresh portion where a further group of lines is written in a single exposure.
3. Effectively controlling the grating writing process on a line-by-line basis allows accurate apodisation to be achieved. This may be performed by dithering the grating writing interferometer position in the fibre to wash out or attenuate the grating strength whilst keeping the average index change constant.
4. The technique offers the further advantage that the CW laser may be extremely stable, whereas pulsed lasers (e.g. those used in R. Stubbe et al. supra) may suffer from pulse-to-pulse instability which is not averaged. In addition the high peak powers of the pulsed laser may cause non-linear grating writing effects.
5. Arbitrary phase profiles and in particular a linear chirp can be built up by inducing phase shifts electronically along the grating as it grows. In a similar manner to the "Moving fibre/phase mask" technique M. J. Cole et al. Electronics Letters, Vol 31 (17), pp 1488–9, 1995, the maximum wavelength is inversely proportional to the beam diameter. This can be further improved in particular embodiments by incorporating a short, linearly chirped phase mask.

Thus as the fibre is scanned the UV beam may be also slowly scanned across the phase mask, an additional small phase shift is induced, whilst most significantly providing access to writing lines of a different period allowing larger chirps to be built up.

GB9617688.8 also provides apparatus for fabricating an optical fibre grating having a plurality of grating lines of refractive index variation, the apparatus comprising:

a writing light beam source for repeatedly exposing a spatially periodic writing light pattern onto a photosensitive optical waveguide; and means for moving the writing light pattern and/or the waveguide between successive exposures of the writing light pattern, so that each of at least a majority of the grating lines is generated by at least two exposures to different respective regions of the writing light pattern.

FIG. 7 is a schematic diagram of the fibre grating fabrication apparatus of GB9617688.8. An optical fibre (e.g. a single mode photorefractive fibre) 310 is mounted on a crossed roller bearing translation stage 320 (such as a Newport PMLW160001) which allows for a continuous scan over 40 cm. The fibre 310 is positioned behind a short (–5 mm) phase mask 330 (e.g. a mask available from either QPS or Lasiris). The fibre is continuously and steadily linearly translated or scanned in a substantially longitudinal fibre direction during the grating exposure process. Ultraviolet (UV) light at a wavelength of 244 nm from a Coherent FRED laser 40 is directed to the fibre/phase mask via an acoustic-optic modulator 50 (e.g. a Gooch & Housego. M110-4(BR)) operating on the first order.

The relative position of the fibre to the interference pattern of the phase mask is continuously monitored with a Zygo. ZMI1000 differential interferometer 355. The interferometer continuously outputs a 32-bit number (a position value) which gives the relative position with a ~1.24 nm resolution. This output position value is compared by a controller 370 with switching position data output from a fast computer 360 (e.g. an HP Vectra series 4 5/166 with National Instruments AT-DIO-32F) in order that the controller can determine whether the UV beam should be on or off at that position. Whether the UV beam is in fact on or off at any time is dependent on the state of a modulation control signal generated by the controller 370 and used to control the acousto-optic modulator 350.

So, as each position value is output by the interferometer, the controller 370 compares that position value with the switching position data currently output by the computer 360. If, for illustration, the interferometer is arranged so that the position values numerically increase as the fibre scan proceeds, then the controller 370 detects when the position value becomes greater than or equal to the current switching position data received from the computer 360. When that condition is satisfied, the controller 370 toggles the state of the modulation control signal. i.e. from "off" to "on" or vice-versa. At the same time, the controller 370 sends a signal back to the computer 60 requesting the next switching position data corresponding to the next switching position.

If the fibre was scanned with the UV beam continuously directed onto the fibre, no grating would be written since the grating lines would be washed out by the movement. However if the UV beam is strobed or modulated (under control of the switching position data generated by the computer 60) with a time period matching or close to:

phase mask projected fringe pitch/fibre translation speed then a long grating would grow.

This expression is based on a time period of a temporally regular modulation of the UV beam, and so assumes that the fibre is translated at a constant velocity by the translation stage. However, more generally, the switching on and off of the UV beam is in fact related to the longitudinal position of the fibre, so that in order to generate a grating the UV beam should be turned on and off as the fibre is translated to align the interference pattern arising from successive exposures through the phase mask.

FIGS. 8*a* to 8*c* are schematic diagrams showing a grating fabrication process by repeated exposures of the fibre to the UV beam. In FIG. 8*a*, the UV beam from the acousto-optic modulator 350 passes through the phase mask 330 to impinge on the fibre 310. During the exposure process, the fibre 310 is being longitudinally translated by the translation stage 320 in a direction from right to left on the drawing. FIG. 8*a* illustrates (very schematically) a refractive index chance induced in the fibre by a first exposure through the phase mask.

FIGS. 8*a* to 8*c* illustrate a feature of the normal operation of a phase mask of this type, namely that the pitch of the lines or fringes of the interference pattern projected onto the fibre (which gives rise to the lines of the grating) is half that of (i.e. twice as close as that of) the lines physically present (e.g. etched) in the phase mask. In this example, the phase mask has a "physical" pitch of 1 $\mu$m, and the lines projected onto the fibre have a pitch of 0.5 $\mu$m.

The UV beam is modulated by the acousto-optic modulator in a periodic fashion synchronised with the translation of the fibre. In this way, successive exposures, such as the two subsequent exposures shown in FIGS. 8*b* and 8*c*, generate periodic refractive index changes aligned with and overlapping the first exposure of FIG. 8*a*. Thus, the refractive index change providing each individual grating "element" or fringe is actually generated or built up by the cumulative effects of multiple exposures through different parts of the phase mask as the fibre moves along behind the phase mask. This means (a) that the optical power needed to generate the grating can be distributed between potentially a large number of exposures, so each exposure can be of a relatively low power (which in turn means that the output power of the laser 340 can be relatively low); and (b) the grating can be apodised by varying the relative positions of successive exposures.

Although each of the successive exposures of the fibre to UV light through the phase mask 330 could be a very short pulse (to "freeze" the motion of the fibre as the exposure is made), this has not proved necessary and in fact there can be used an exposure duty cycle in a range from below 10% to about 50%, although a wider range of duty cycles is possible. An example of a simple regular exposure duty cycle is shown schematically in FIG. 9*a*, which in fact illustrates the state of the modulation control signal switching between an "on" state (in which light is passed by the acousto-optic modulator) and an "off" state (in which light is substantially blocked by the acousto-optic modulator). The period, T, of the modulation corresponds to the time taken for the fibre 310 to be translated by one (or an integral number) spatial period of the interference pattern generated by the phase mask 330.

As the duty cycle for the UV exposure increases, the grating contrast decreases (because of motion of the fibre during the exposure) but the writing efficiency increases (because more optical energy is delivered to the fibre per exposure). Thus, selection of the duty cycle to be used is a balance between these two requirements.

Assuming linear growth, the index modulation, $n_g(z)$ in an ideal crating can be described as a raised cosine profile:

$$n_g(z) \propto 1+\sin(2\pi z/\Lambda)$$

where z is the position down the fibre and $\Lambda$ the grating period. With this technique one obtains:

$$n_g(z) \propto (\Delta\Lambda_{ON}/\Lambda)[1+\{\sin(\pi\Delta\Lambda_{ON}/\leftarrow)/(\pi\Delta\Lambda_{ON}/\Lambda)\}\sin(2\pi(z+\Delta\Lambda_{ON}/\Lambda))]$$

where $\Delta\Lambda_{ON}/\Lambda$ is the fraction of the period that the beam is on (i.e. the duty cycle). For small values of $\Delta\Lambda_{ON}/\Lambda$ a near 100% grating contrast is obtained however the efficiency of the grating writing is reduced to $\sim\Delta\Lambda_{ON}/\Lambda$ because most of the UV beam is prevented from reaching the fibre. The maximum grating strength is obtained for $\Delta\Lambda_{ON}/\Lambda=0.5$ however the ratio of dc to ac index change is worse. For $\Delta\Lambda_{ON}/\Lambda>0.5$ the grating begins to be reduced whilst the dc index change continues to build. Experimentally, a good value for $\Delta\Lambda_{ON}/\Lambda$ has been found to be ~0.3–0.4.

Thus, with embodiments of this technique, exposure of the grating lines or elements is repeated every grating period. Thus the footprint defined by the UV beam, which might for example for a 500 $\mu$m diameter beam, $\phi_{beam}$, consists of $\phi_{beam}/\Lambda$(~1000) lines, is significantly overlapped with the previously exposed lines. Significant averaging of the writing process given by $(\phi_{beam}/\Lambda)^{1/2}$ is therefore achieved, thus improving the effective accuracy and resolution of the system.

The computer in this embodiment actually generates the switching positions internally as "real" numbers (subject to the limitation of the number of bits used), but then converts them for output to the controller into the same unit system as that output by the Zygo interferometer, namely multiples of a "Zygo unit" of 1.24 μm. This internal conversion by the computer makes the comparison of the actual position and the required switching position much easier and therefore quicker for the controller. A random digitisation routine is employed in the computer 360 to avoid digitisation errors during the conversion from real numbers to Zygo units. This involves adding a random amount in the range of ±0.5 Zygo units to the real number position data before that number is quantised into Zygo units. Thus an effective resolution can be obtained of:

$$1.24\ \text{nm}(\phi_{beam}/\Lambda)^{1/2} \approx 0.03\ \text{nm}.$$

The technique offers the further advantage that the CW laser is extremely stable whereas pulsed lasers (as required in the technique proposed by Stubbe et al, supra) may suffer from pulse-to-pulse instability which, in the Stubbe et al technique, is not averaged over multiple exposures. In addition the high peak powers of a pulsed laser may cause non-linear grating writing effects, which are avoided or alleviated by using longer and repeated exposures in the present technique.

A refinement of the above technique, for producing apodised gratings, will now be described with reference to FIG. 9*b*. Using the techniques described above, effectively controlling the grating writing process on a line-by-line basis allows accurate apodisation to be achieved. Apodisation is achieved by effectively dithering the grating writing interferometer position in the fibre to wash out or attenuate the grating strength. However, if the overall duty cycle of the exposure is kept the same, and gust the timing of each exposure dithered, the average index change along the grating is kept constant.

To completely wash out the grating subsequent on periods of the UV laser are shifted in phase (position) by ±π/2(±Λ/4). To achieve a reduced attenuation the amplitude or amount of dither is reduced. FIG. 9*b* illustrates an applied dither of about +π/3 from the original (undithered) exposure times. This technique of apodising is better with an exposure duty cycle of less than 50%, to allow a timing margin for 100% apodisation.

One example of the use of this technique is to generate a grating with a contrast increasing at one end of the grating according to a raised cosine envelope, and decreasing at the other end of the grating in accordance with a similar raised cosine envelope, and remaining substantially constant along the central section of the grating. This apodisation can be achieved particularly easily with the present technique, as the central section requires no phase shift between successive exposures, and the two raised cosine envelopes require a phase shift that varies linearly with longitudinal position of the fibre.

The required phase shifts can be calculated straightforwardly by the computer 360, under the control of a simple computer program relating required phase shift to linear position of the fibre (effectively communicated back to the computer 360 by the controller 370, whenever the controller 370 requests a next switching position data value).

Other apodisation schemes are also possible. Compared with previous methods of dithering such as that of M. J. Cole et al. Electronics Letters, Vol 31 (17), pp 1488–9, 1995, this technique is not limited by the dynamics of a mechanical stage used for dithering, but instead simply adjusts the switching time of a nonmechanical modulator element 350. It can also achieve substantially instantaneous phase shifts.

Furthermore, arbitrary phase profiles and in particular a linear chirp can be built up by the computer 360 inducing phase shifts along the grating as it is fabricated. In a similar manner to the "Moving fibre/phase mask" technique of M. J. Cole et al, the maximum wavelength is inversely proportional to the beam diameter. However, with the technique of GB9617688.8, an improvement can be obtained (with respect to the technique of M. J. Cole et al) by incorporating a short, linearly chirped phase mask. Thus as the fibre is scanned the UV beam is also slowly scanned (by another PZT translation stage, not shown) across the phase mask. This scanning of the position of the UV beam in itself induces a small chirp, in accordance with the techniques described in reference M. J. Cole et al. supra, but more significantly the translated beam accesses writing lines of a different period allowing larger chirps to be built up. This has been tested using a 19 mm diameter, ~20 nm chirped phase mask (sourced from Lasiris) with its central period around 1070 nm. This allows ~30 nm chirped gratings centred around a central wavelength of 1550 nm to be fabricated.

FIGS. 10*a* and 10*b* are schematic graphs showing the characterisation of a 20 cm linearly chirped grating written at a fibre translation speed of 200 μm/s with the basic technique described earlier, i.e. with a fixed mask. At this fibre translation speed, for a projected fringe pitch of 0.5 μm the writing light beam is switched at a switching rate of 400 Hz. In other words, the fibre advances by one projected fringe between exposures. (It is noted that the limitation on fibre translation speed in these prototype experiments is the calculation speed of the computer 360 used in experiments, and that given a faster computer such as a Pentium or subsequent generation PC, much higher translation speeds of, say, 10 mm per second or more would be possible).

In particular, therefore, FIG. 10*a* is a graph of reflectivity against wavelength, and FIG. 10*b* is a graph of time delay against wavelength. The wavelength (horizontal) axes of the two graphs have the same scale, which for clarity of the diagram is recited under FIG. 10*b* only.

A ~4 nm bandwidth and dispersion of ~500 μs/nm are observed. Gratings up to 40 cm and writing speeds up to 1 mm/s have been demonstrated. Lengths in excess of 1 m and writing speeds up to 10 mm/s are feasible.

In the above description, the fibre has been translated with respect to the phase mask, and in the later description the UV beam is translated with respect to the phase mask. However, the important thing is relative motion, and so the choice of which component (if any) remains "fixed" and which is translated is relatively arbitrary.

In regard to the present invention, the initial horizontal linearly polarisation state of the laser was flipped to a vertical linearly polarised state using a X/2-wave plate, The DFB grating was written with a n-phase shift (identical for both polarisations) off centre [9] by 10% in order to maximise the output to one side of the laser. Up to 50 mW of light from a 980 nm diode was used as pump light. The laser was forward pumped and the polarisation state of the prototype laser was analysed using a HP 8905B polarisation analyser. The phase shift could of course have been different, for example many multiples of π.

Results for Prototype Laser

Figure 1:
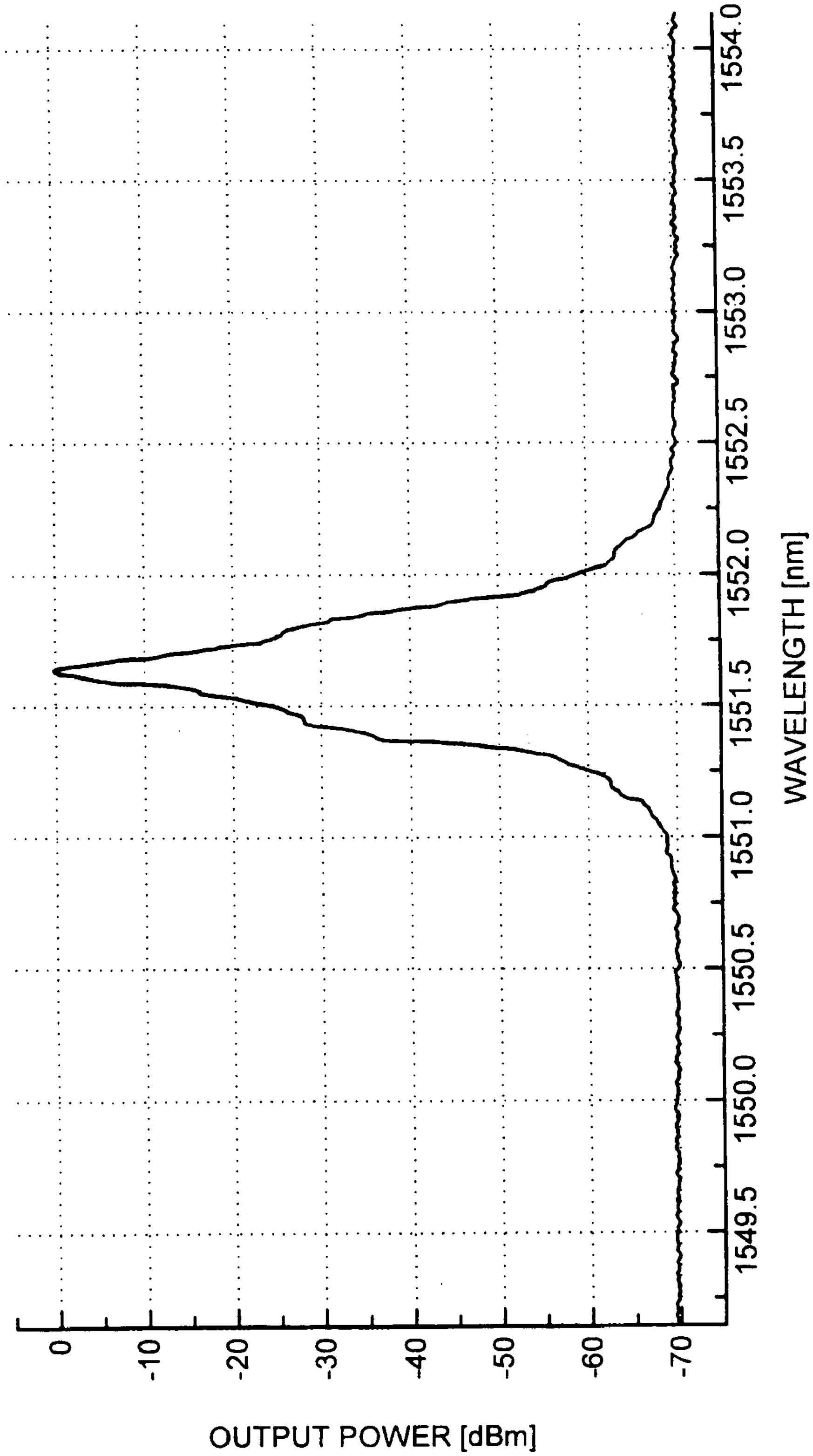
FIG. 1 illustrates the output spectrum of a single polarisation and single frequency DFB laser with 20 mW pumped power @980 nm.
Figure 2:
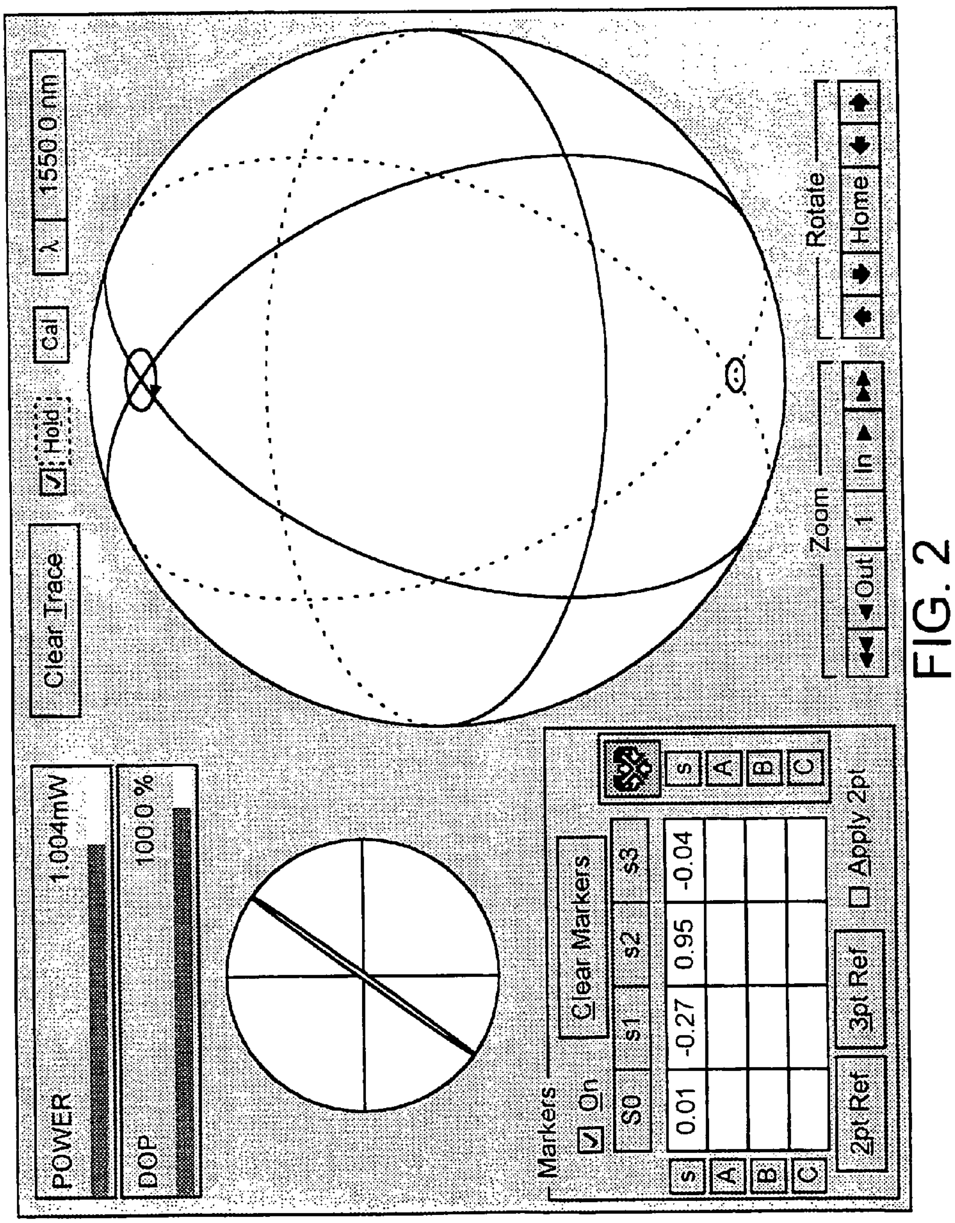
FIG. 2 illustrates the so-called Poincare sphere output representation of the laser of FIG. 1.

FIG. 1 shows the output spectrum of a 5 cm long single frequency, single polarisation prototype DFB fibre laser pumped with 20 mW @ 980 nm. The linewidth of the laser was measured to be as low as 3 kHz. An output power ratio of 30 dB between the output ends was observed. Being properly temperature stabilised the laser showed stable output power (3.1 dBm±0.05 dBm) for ~50 mW pump @ 980 nm and stable single polarisation operation over a period of hours. FIG. 2 shows the Poincare sphere output of the laser and shows that the degree of polarisation is 1, indicating single polarisation operation. The laser was also pumped with 1480 nm and showed despite the lower output power also single polarisation output.

The laser written with the UV light polarised orthogonal to the fibre axis were tested against a laser written with a birefringent phase-shift (only orthogonal polarised UV writing beam in the phase-shift region) as has been the only recently, demonstrated writing procedure. See for example reference [20], where a two-step process is required to achieve a working single polarisation laser, and the process is subject to degradation as the tuned phase shift decays in time. We found that the all birefringent laser showed more stable single polarisation operation than the birefringent phase-shift laser. In particular for higher pump powers showed the birefringent phase-shift DFB occasional dual polarisation mode operation.

The fabrication process is summarised in FIG. 3*a*, which illustrates a section 10 of a photosensitive optical fibre 20 being exposed via a phase mask 25 to a writing light beam 30 which (in this example) is polarised substantially orthogonally to the axis of the section 10.

FIG. 3*b* illustrates an application of such a laser as part of a frequency standard device. If the laser is arranged to operate simultaneously at two wavelengths but one polarisation then these wavelengths λ1 and λ2 will be separated by Δλ. This can be achieved by overlaying two DFB grating structures or by writing simultaneously as a Moire phase shifted structure. This difference can be detected as an RF beat frequency between the two output wavelengths.

It can easily be shown that Δλ is proportional to λ1 (or λ2). So (as illustrated in FIG. 6(*c*) by monitoring Δλ using an optical detector 200 and an RF frequency detector and applying the result via a feedback circuit 210 (e.g. comparing Δλ with a reference RF signal $RF_{ref}$) to a wavelength control of the laser 220 operation (e.g. a temperature control), great stability in the wavelength of the two outputs of the laser can be achieved.

A further application of such a laser will now be described.

FIGS. 4*a* and 4*b* show the configuration of a phase conjugator/wavelength converter. The converter uses FWM pump sources 100, 110, 120 which are $Er^{3+}$:$Yb^{3+}$ fibre DFB lasers [18] pumped with 980 nm 100 mW laser diodes (LD's). Preferably the lasers are fabricated as described earlier.

To achieve polarisation independence, the FWM pump lights should preferably be orthogonally polarised at equal powers [14], [15], so these embodiments use either (a) a dual-polarisation fibre DFB laser (FIG. 4(*a*)), or (b) two single-polarisation fibre DFB lasers cascaded through a polarisation controller (PC) 130 (FIG. 4(*b*)).

Since the fibre DFB lasers are transparent at the signal wavelength, the signal and the DFB generated FWM pump lights are combined through direct injection of the signal light into one end of the fibre DFB laser. This eliminates the need of a polarisation combiner and a signal/pump coupler as required in a conventional polarisation independent device. After amplification by an Er3+-doped fibre amplifier (EDFA) 140, the signal and pump lights are launched into a dispersion shifted fibre (DSF) 150, generating a conjugate light which is insensitive to the signal polarisation owing to the two orthogonally polarised pump lights. Optical isolators 160 are also used to prevent unwanted reflections.

FIGS. 5*a* and 5*b* show the output optical spectra of the phase conjugator/wavelength converter using a dual-polarisation fibre DFB laser in FIG. 4(*a*). The fibre DFB laser is 5 cm in length, operating at 1548.7 nm in two orthogonal polarisations separated by about 0.8 GHz, due to the birefringence in the fibre DFB resonator, for this "imperfect" (i.e. practical prototype) laser. The optical powers of the two polarisations are slightly different at the "free-running state", but they can be changed by applying a stress at the mid-point of the fibre DFB laser as a result of the anisotropic phase shift induced in the two birefringent axes. By proper adjustment of the strength, the orientation and the position of the stress, we could force it operate either in two polarisations with equal powers, or in a single polarisation. The half-width of the unpumped DFB resonator stop band is measured to be about 0.2 nm. The pass band insertion loss of the DFB laser module including two isolators is about 9.7 dB. This can be reduced to be as low as 1 dB with better components and splices. A tuneable single frequency laser operating at 1550.5 nm is used as a signal source, and a 11 km-DSF with zero-dispersion wavelength at 1548 nm is used as a non-linear FWM media. The output spectrum is measured using an optical spectrum analyser (OSA) (with 0.08 nm resolution) with scanning with a maximum hold trace (solid) and a minimum hold trace (dashed). The signal polarisation state is varied arbitrarily over all states using a PC throughout the measurement. FIG. 5(*a*) shows the output spectrum when the fibre DFB laser operates at dual polarisations. As expected, nearly polarisation independent phase conjugation was realised. Remaining polarisation dependency is about 0.5 dB. When the fibre DFB laser operates at a single polarisation (FIG. 5(*b*)), the conjugate light suffered large fading over 30 dB.

Although the single polarisation lasers in this example did not employ the new fabrication technique described above, in other embodiments such a technique is used and provides associated benefits.

It should be noted that this particular example of dual-polarisation fibre DFB laser can not be used with the signal bit-rate of higher than 400 Mbit/s, because the signal bit rate must be less than half of the frequency separation of two pump lights [15]. The frequency separation can be expanded to more than 40 GHz using a highly birefringent Er3+: Yb3+ fibre [18].

FIGS. 6*a* and 6*b* show the output optical spectra of the phase conjugator/wavelength converter using two single-polarisation fibre DFB lasers cascaded through a PC, as shown in FIG. 4(*b*). The fibre DFB lasers are operating at 1548.7 mm (pump 1) and 1550 nm (pump 2) in a single polarisation using the above stress method. Incident FWM pump powers into the DSF are set to be equal by adjusting respective 980 nm pump powers of the fibre DFB lasers. Note that the isolators before and after the PC are not essential. FIG. 6(*a*) is when the polarisation states of two pump lights are set to be orthogonal by adjusting the PC between the two fibre DFB laser modules. The PC was actually set to minimise the mixing products between pump 1 and pump 2 appearing at 1547.4 nm and 1551.3 nm. The signal wavelength is set at 1549.5 nm between pump 1 and pump 2. In this case, many mixing products are generated owing to the completely non degenerate FWM process, and the phase conjugate components to the signal appear at 1547.9 nm conjugate 1, 1549.3 nm conjugate 2, and 1550.5 nm (conjugates). A solid trace is when conjugate 1 reaches a maximum, and a broken trace is when it reaches minimum.

It is observed that conjugate 2 is polarisation independent, and one of conjugate 1 and conjugate 3 reaches maximum when the other reaches minimum. The remaining polarisation dependency of conjugate 2 is about 0.5 dB. FIG. 6(*b*) is when the polarisation states of two pump lights are set to be aligned to maximise the mixing products between pump 1 and pump 2. Conjugate 2 is found to have a large polarisation dependency over 20 dB, although the maximum conversion efficiency is improved by 5.3 dB compared to that in FIG. 6(*a*), which agrees well with the theoretical value of 6 dB. The signal wavelength can be set far from pump wavelengths, but the conversion efficiency becomes poor due to the non ideal zero-dispersion wavelength of the DSF.

In summary, a novel technique for optical wavelength conversion and phase conjugation by fibre FWM using inline fibre DFB lasers as orthogonally polarised pump sources has been described. It features substantially polarisation independent operation and simple configuration without the need for a polarisation combiner and a signal/pump coupler as required in a conventional polarisation independent device. Polarisation independent operation of the phase conjugator/wavelength converter has been described, to achieve a polarisation dependency as low as 0.5 dB. It is also possible to integrate the fibre DFB laser module into an EDFA. Furthermore, this technique is applicable to FWM in an SOA or in a chalcogenide fibre as well as in a DSF.

PUBLICATION REFERENCES

[1] KRINGLEBOTN, J T. et al: Optics Lett., 19, pp. 2101–2103, 1994.
[2] ASSEH, A. et al: Electron. Lett., 31, (9), pp. 969–970, 1995.
[3] LOH, W H. et al: Electron. Lett., 31, (17), pp. 1440–1442, 1995.
[4] HÜBNER, J. et al: Electron. Lett., 33, (2), pp. 139–140, 1997.
[5] HARUJUNIAN, Z. E. et al: Electron. Lett., 32, (4), pp. 346–348, 1996.
[6] DOUAY, M. et al: IEEE Photon., Technol., Lett., 4, pp. 844–846, 1992.
[7] NIAY, P. et al: IEEE Photon., Technol., Lett., 7, (4), pp. 391–393, 1995.
[8] DONG, L. et al: Optics Lett., 22, (10), pp. 694–696, 1997.
[9] LAURIDSEN, V C. et al: Proceedings to *ECOC'*97, 3, pp. 39–42, Session WEIC, Edinburgh, UK, 1997.
[10] ELLIS, A et al, Electron. Lett., 31, (4), pp. 299–301, February 1995.
[11] ROYSET, A et al, IEEE Photon. Technol. Lett., 8, (3) pp. 449–451, March 1996.
[12] HASEGAWA, T et al, IEEE Photon. Technol. Lett., 5, pp. 947–949, August 1993.
[13] LACET, J P R et al, IEEE Photon. Technol. Lett., 9, (10), pp. 1355–1357, October 1997.
[14] JOPSON R M et al, Electron. Lett., 29, (25), pp. 2216–2217., December 1993.
[15] INOUE, K, J. Lightwave Technol., 12, (11), pp. 1916–1920, November 1994.
[16] KUWATSUKA, H et al,. Electron. Lett., 31, (24), pp. 2108–2110, November 1995.
[17] WATANABE, S et al,. Electron. Lett., 33, (4), pp. 316–317, February 1997.
[18] LOH, W H et al, J. Lightwave Technol., 16, (1), pp. 114–118, January 1998.
[19] LOH, W H et al, Electron. Lett., 33, (7), pp. 594–595, March 1997.
[20] STOROY, H, PhD Thesis, Norges Tekmisk-naturvitenskapelige Universitet Trondheirn, FYS.EL-rapport 1997: 22, February 1997

What is claimed is:

1. A method of fabricating an optical fiber laser, the method comprising:

repeatedly exposing an optical fiber to a transverse writing light beam to form a DFB grating structure in a section of the optical fiber, the writing light beam being polarized in a direction not parallel to the axis of the section of the optical fiber so that the induced grating structure has a different grating strength for two orthogonal polarization modes of the optical fiber; and moving at least one of the optical fiber and the writing light beam between each exposure;

wherein the grating structure has a discrete phase shift which is substantially identical for the two orthogonal polarization modes and the grating structure is formed without introducing a phase shift by post processing of the orating structure.

2. A method according to claim 1, in which the writing light beam is polarized in a direction substantially perpendicular to the axis of the section of the optical fiber.

3. A method according to claim 1, in which the writing light beam is an ultraviolet beam.

4. A method according to claim 3, in which the ultraviolet beam has a wavelength of about 244 nanometers.

5. A method according to claim 1, in which the optical fiber section is doped with at least one amplifying dopant.

6. A method according to claim 5, in which the optical fiber section is doped with at least one rare earth element.

7. A method according to claim 6, in which the optical fiber section is doped with erbium and ytterbium.

8. A method according to claim 1, wherein the optical fiber laser is stressed to provide substantially single polarization operation.

9. A method according to claim 1, wherein the optical fiber laser is stressed to provide dual polarization operation.

10. A method according to claim 1, wherein the grating structure is written as a Moire phase shifted structure to provide lasing operation at two wavelengths having one polarization.

11. A method according to claim 1, wherein the grating structure is written as first and second overlaying DFB grating structures to provide lasing operation at two wavelengths having one polarization.

12. A method according to claim 1, wherein the movement is carried out such that at least a majority of grating lines from the grating structure are generated by exposure to different respective regions of the writing light beam.

13. A method of fabricating an optical fiber laser, the method consisting of the step of repeatedly exposing an optical fiber to a transverse writing light beam to form a plural grating structures in different sections of the optical fiber, the writing light beam being polarized in a direction not parallel to the axis of the section of the optical fiber so that the induced grating structure has a different grating strength for two orthogonal polarization modes of the optical fiber, the grating structure having a discrete phase shift which is substantially identical for the two orthogonal polarization modes and the grating structure is formed without introducing a phase shift by post processing of the grating structure.

14. A method according to claim 13, in which the writing light beam is polarized in a direction substantially perpendicular to the axis of the section of the optical fiber.

15. A method according to claim 13, in which the writing light beam is an ultraviolet beam.

16. A method according to claim 15, in which the ultraviolet beam has a wavelength of about 244 nanometers.

17. A method according to claim 13, in which the optical fiber section is doped with at least one amplifying dopant.

18. A method according to claim 17, in which the optical fiber section is doped with at least one rare earth element.

19. A method according to claim 18, in which the optical fiber section is doped with erbium and ytterbium.

20. A method according to claim 13, wherein the optical fiber laser is stressed to provide substantially single polarization operation.

21. A method according to claim 13, wherein the optical fiber laser is stressed to provide dual polarization operation.

22. A method according to claim 13, wherein the grating structure is written as a Moire phase shifted structure to provide lasing operation at two wavelengths having one polarization.

23. A method according to claim 13, wherein the grating structure is written as first and second overlaying DFB grating structures to provide lasing operation at two wavelengths having one polarization.

24. A method according to claim 13, wherein the grating structure is a DFB grating structure.

25. A method according to claim 13, wherein the grating structure is formed without tuning of the discrete phase shift.

* * * * *